Patented Feb. 12, 1952

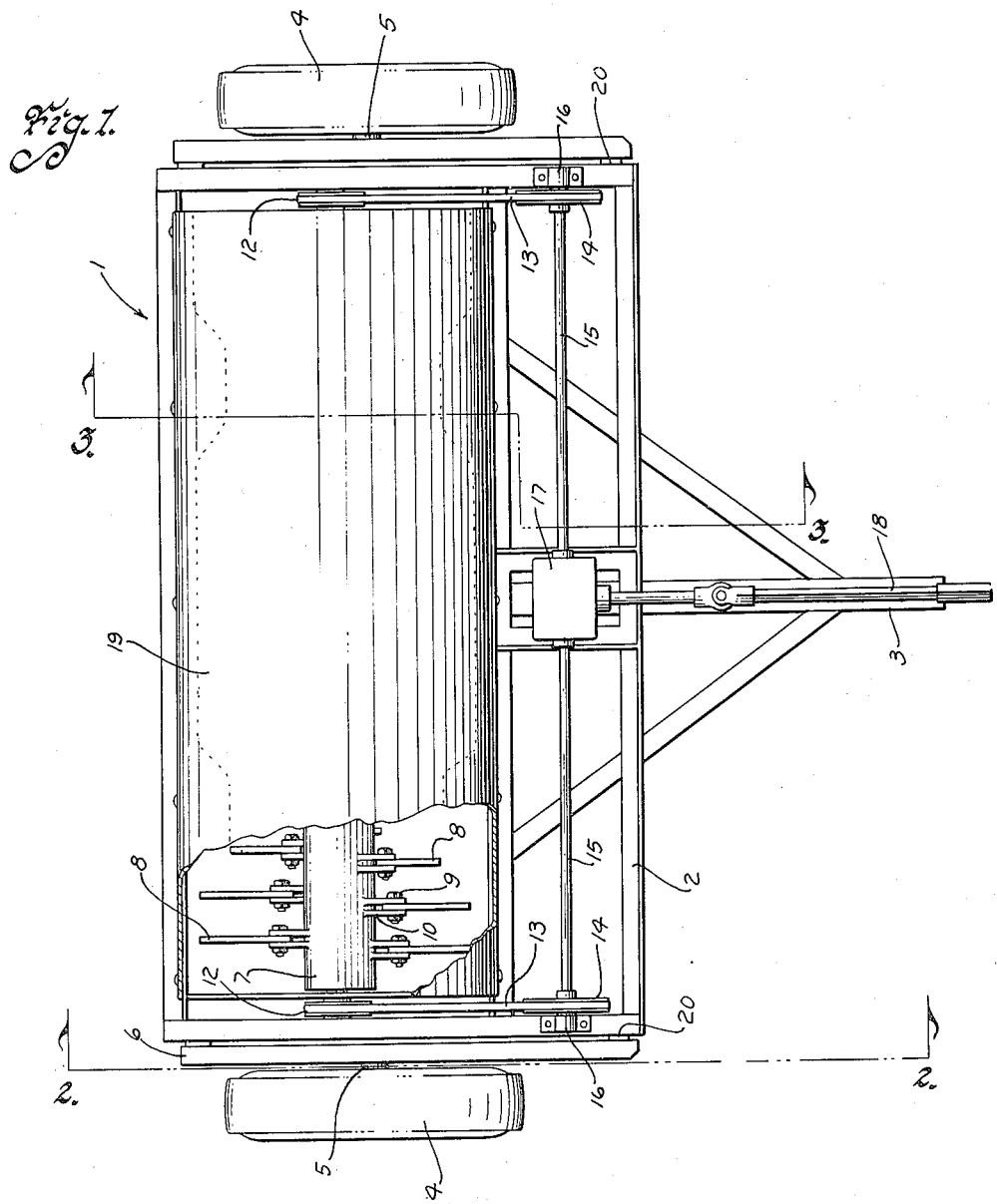

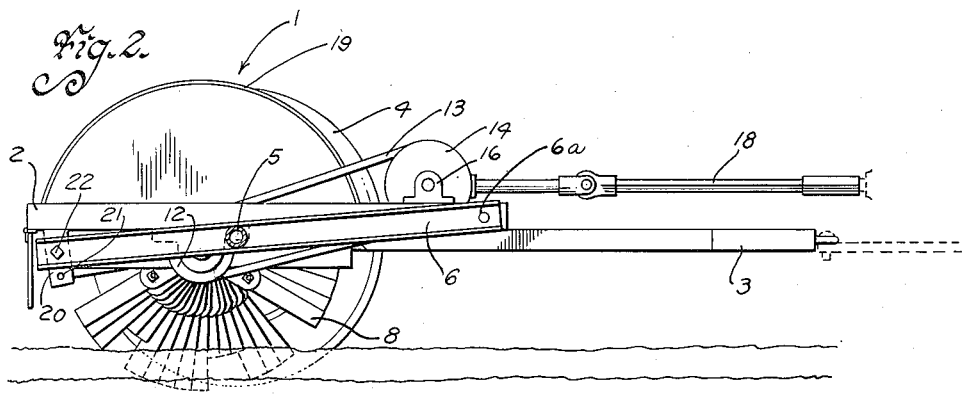
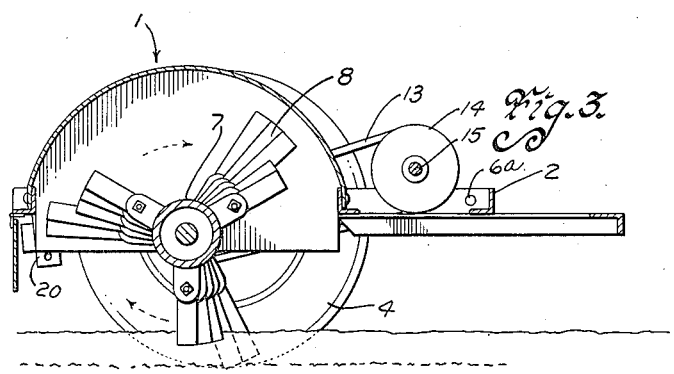
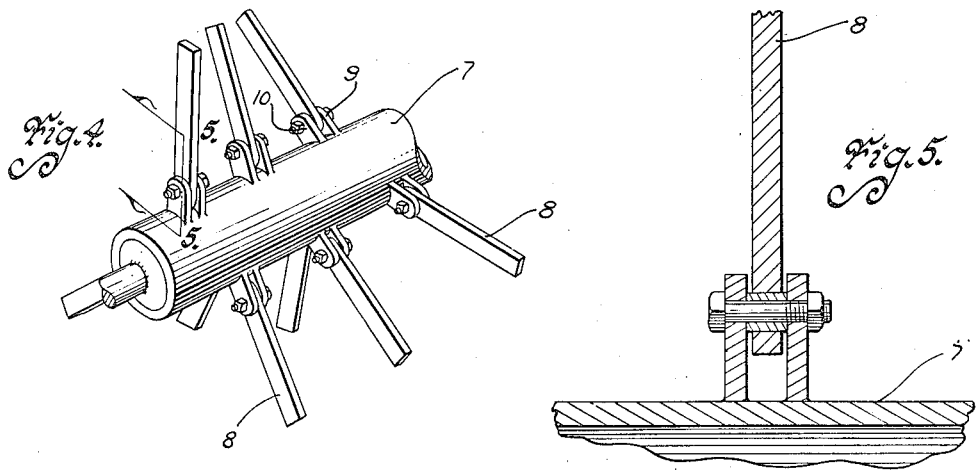

2,585,296

UNITED STATES PATENT OFFICE 2,585,296

CORNSTALK CRUSHER

David A. Bennett and Roy E. Bennett,
Lenox, Iowa

Application May 11, 1949, Serial No. 92,555

4 Claims. (Cl. 55—118)

This invention relates to a means for crushing corn stalks left standing in a field after the ear of corn has been picked from the corn stalks and more particularly to rotating hammers which deliver an impact blow to the corn stalks to crush and shred the stalks.

Cornstalks have been disced in the fields in the spring in order to reduce their size for handling in plowing, planting and cultivating. Discing is never satisfactory at best because so many stalks and portions of stalks are missed by the cutter discs and are never cut at all. It has been found that the corn borers remain in the corn stalk all winter and in the spring come to life again. If the corn stalks are cut into a minimum of one inch lengths, all corn borers will be cut and destroyed. It is very desirable for this reason to crush the corn stalks. Then, too, the corn stalks will disintegrate into fertilizer value quicker if they are crushed and the decomposition action can start faster. It is with the problem of crushing, shredding and decomposing corn stalks that the present invention is concerned.

It is an object of the invention, among others, to provide a means for crushing corn stalks in a field by a wheeled crusher that is towed through the field the crusher having rotating hammer impact members contacting the corn stalks to crush and pulverize the corn stalks.

It is another object of the invention, to provide a corn stalk crusher that is simple and rugged in construction and will withstand rugged use without breakdown; a device that has a minimum of moving parts hence very little to get out of working order; a crusher that operates over a double row where the hills extend upward into the air; and a crusher so constructed to absorb the impact blows delivered from the power means.

It is still another object of the invention, to provide a corn stalk crusher wherein the hammers rotate in the direction of travel of the crusher instead of reversely to the direction of travel.

Other objects and advantages of the invention will be apparent during the course of the following description.

In the accompanying drawings, forming a part of this application and in which like numerals are employed to designate like parts throughout the same.

Figure 1 is a top plan view of the crusher with some parts broken away.

Figure 2 is a sectional view taken on the line 2—2 of Figure 1.

Figure 3 is a sectional view taken on the line 3—3 of Figure 1.

Figure 4 is a fragmentary perspective view of the knocker shaft and illustrating the knockers thereon.

Figure 5 is a sectional view taken on the line 5—5 of Figure 4.

The crusher shown generally at 1 comprises generally a rectangular frame 2 to which a tow bar 3 is connected. The frame 2 has regular automobile wheels 4 attached thereto to make the crusher mobile when a tractor (not shown) is connected to the tow bar 3. The stub axles 5 of each wheel 4 (Figure 2) are connected to a side frame member 6 forming part of the frame 2 to make the structure mobile without interfering with the operation of the crusher, rotor and blades.

As shown in Fig. 2, the side frame members 6 which carry the wheel axles 5 are pivoted as at 6a to the outer side of the forward end of the main frame 2. Fig. 2 also shows that frame 2 has at its rear end at each side a depending extension 20 having a lineal series of apertures 21 adapted to selectively receive a bolt 22 of frame member 6. This arrangement enables frame 2 to be adjusted different distances from the ground level.

On the frame 2, extending from one side to the other side of the frame 2, is a cylinder or drum 7 journaled to rotate in the frame 2 in bearings at each opposite side of the frame 2. A series of hammers 8 are pivotally attached at 9 to a pair of spaced ears or prongs 10, which are rigidly attached to the drum 7 as by welding or the like. A hardened pin 11 extends through openings in the ears and supports a sleeve bushing 11a between the same, the sleeve bushing receiving the bored end of the hammer 8 whereby the same is pivoted.

Each end of the drum shaft 7a has a pulley 12 mounted thereon which connects through a V-belt 13 to pulleys 14 on the respective ends of the shaft 15 which is journaled on the forward end of the frame 2. The shaft 15 is in two pieces, having its opposite ends journaled to the frame at 16 and the shafts 15 connecting into a gear box 17 in the center of the frame. A power take-off 18 extending at right angles to gear-box 17 extends to the tractor (not shown) to connect to the power take-off of the tractor to provide a power transmission means through the crusher to rotate the drum 7.

The hammers 8 are longitudinally spaced apart on the drum 7 and as shown in Figure 3, there are three rows of hammers 8 on the drum 7. Each row of hammers 8 are spaced circumferentially the length of the drum 7 so that the three rows of hammers 8 make one complete revolution around the drum 7. In effect, the hammers 8 make a spiral path around the drum 7.

In operation, the crusher 1 is coupled to a tractor (not shown) through bar 3 and the tractor power take-off is coupled through the power transmission system 18, gear box 17, shafts 15 and belts 13 to drum 7 whereby power is derived for rotation of the drum and hammers 8. The drum is rotated at an extremely high speed which develops great striking power to the hammers as they strike the corn stalks and the ground as seen in Figure 3, the drum 7 is long enough to accommodate a plurality of different length hammers for operation on two rows in a field. As the rows comprise hills and valleys the hammers are arranged upon the drum so that the longer hammers are adapted to register with the valleys, while the shorter hammers register with the hills. A shield 19 covers the hammers to prevent earth and shreds of corn stalk from being thrown around.

It is to be understood that the form of our invention herewith shown and described, is to be taken as a preferred example of the same and that various changes in shape, size and arrangement of parts may be resorted to without departing from the spirit of our invention, or the scope of the subjoined claims.

Having thus described our invention, we claim:

1. A mobile cornstalk crusher adapted to be towed behind a tractor having a power-takeoff, comprising: a substantially rectangular frame; a pair of ground-engaging supporting wheels at opposite sides thereof; means connecting said wheels to said frame for relative vertical adjustment thereon; a tow bar secured to the front of said frame for towing connection to the tractor; a rotatable drum mounted on said frame and extending from side to side thereof transversely therewithin in approximate alignment with said wheels; means for rotating said drum from the tractor power-takeoff; and a plurality of rows of closely adjacent rigid striking hammers hingedly secured to said drum for pivotal movement about axes parallel to the drum axis, each of said rows extending from one end of said drum to the other and said hammers being of substantially uniform cross section throughout their entire length.

2. The structure defined in claim 1 in which the means connecting the wheels to the frame includes rearwardly-extending vertically-swingable bars at each side of said frame and pivoted thereto at their forward ends, laterally extending stub axles on said bars carrying said wheels, and cooperating means carried in part by the rear of said bars and in part by the rear of said frame at each side thereof for selectively securing the rear end of said bars in different vertical positions with respect to said frame to thereby selectively vary the distance of said frame from ground level.

3. A mobile cornstalk crusher adapted to be towed behind a tractor having a power-takeoff, comprising: a substantially rectangular frame; a pair of ground-engaging supporting wheels at opposite sides thereof; means connecting said wheels to said frame for relative vertical adjustment thereon; a tow bar secured to the front of said frame for towing connection to the tractor; a rotatable drum mounted on said frame and extending from side to side thereof transversely therewithin in approximate alignment with said wheels; means for rotating said drum from the tractor power-takeoff; and a plurality of rows of closely adjacent rigid striking hammers hingedly secured to said drum for pivotal movement about axes parallel to the drum axis, each of said rows extending spirally from one end of said drum to the other and said hammers being of substantially uniform cross section throughout their entire length.

4. A mobile cornstalk crusher adapted to be towed behind a tractor having a power-takeoff, comprising: a substantially rectangular frame; a pair of ground-engaging supporting wheels at opposite sides thereof; means connecting said wheels to said frame for relative vertical adjustment thereon; a tow bar secured to the front of said frame for towing connection to the tractor; a rotatable drum mounted on said frame and extending from side to side thereof transversely therewithin in approximate alignment with said wheels; means for rotating said drum from the tractor power-takeoff; and a plurality of rows of closely adjacent rigid striking hammers hingedly secured to said drum for pivotal movement about axes parallel to the drum axis, each of said rows extending from one end of said drum to the other and said hammers being of substantially uniform cross section throughout their entire length, the hammers in certain sections of each row being shorter than those in the next adjacent section with the shorter hammers adapted to be aligned with the hills and the longer hammers with the valleys of a cornfield or the like.

DAVID A. BENNETT.
ROY E. BENNETT.

REFERENCES CITED

The following references are of record in the file of this patent:

UNITED STATES PATENTS

| Number | Name | Date |
| --- | --- | --- |
| 1,870,932 | Sternemann | Aug. 9, 1932 |
| 2,341,486 | Swertfeger | Feb. 8, 1944 |
| 2,465,488 | Sears et al. | Mar. 29, 1949 |
| 2,500,914 | Sells et al. | Mar. 14, 1950 |